United States Patent
Jurka et al.

(10) Patent No.: US 10,042,897 B2
(45) Date of Patent: Aug. 7, 2018

(54) SEGMENT-BASED CONTENT POOLS FOR INCLUSION IN CONTENT FEEDS

(71) Applicant: LinkedIn Corporation, Mountain View, CA (US)

(72) Inventors: Timothy P. Jurka, Mountain View, CA (US); Patrick A. Chase, Mountain View, CA (US); Claire D. McGinty, Mountain View, CA (US); Andrew O. Hatch, Mountain View, CA (US); Alejandro Jorge Perez, Mountain View, CA (US); Michael Conover, Mountain View, CA (US); Samuel Stokes, Mountain View, CA (US); Gregory W. Bayer, Mountain View, CA (US); Akshay D. Kothari, Mountain View, CA (US); Ankit Gupta, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 465 days.

(21) Appl. No.: 14/741,308

(22) Filed: Jun. 16, 2015

(65) Prior Publication Data
US 2016/0350310 A1   Dec. 1, 2016

Related U.S. Application Data

(60) Provisional application No. 62/169,231, filed on Jun. 1, 2015.

(51) Int. Cl.
*G06F 17/30* (2006.01)

(52) U.S. Cl.
CPC .... *G06F 17/3053* (2013.01); *G06F 17/30554* (2013.01)

(58) Field of Classification Search
CPC .................. G06F 17/3053; G06F 17/30554
USPC ........................................................ 707/723
See application file for complete search history.

(56) References Cited

U.S. PATENT DOCUMENTS

| | | | |
|---|---|---|---|
| 2006/0170945 A1* | 8/2006 | Bill | G06F 17/30749 358/1.13 |
| 2007/0073579 A1 | 3/2007 | Immorlica | |
| 2009/0089110 A1 | 4/2009 | Lara | |
| 2011/0078004 A1* | 3/2011 | Swanson, Sr. | G06Q 30/02 705/14.13 |
| 2012/0041880 A1* | 2/2012 | Shai | G06Q 10/06 705/51 |
| 2012/0185486 A1* | 7/2012 | Voigt | H04L 51/32 707/741 |
| 2012/0254188 A1 | 10/2012 | Koperski | |
| 2013/0290339 A1 | 10/2013 | LuVogy | |

(Continued)

*Primary Examiner* — Cam-Linh Nguyen
(74) *Attorney, Agent, or Firm* — Park, Vaughan, Fleming & Dowler LLP; Chia-Hsin Suen

(57) ABSTRACT

The disclosed embodiments provide a system for processing data. During operation, the system obtains one or more metrics associated with user interaction with a set of content items in a member segment of a social network. Next, the system ranks the set of content items by the one or more metrics. The system then generates a content pool for the member segment based on the ranking of the content items. Finally, the system creates a content feed from the content pool for presentation to a user in the member segment.

17 Claims, 7 Drawing Sheets

(56) References Cited

U.S. PATENT DOCUMENTS

| | | | |
|---|---|---|---|
| 2014/0040370 A1* | 2/2014 | Buhr | H04L 67/306 |
| | | | 709/204 |
| 2014/0207564 A1* | 7/2014 | Dubey | G06Q 30/02 |
| | | | 705/14.43 |
| 2014/0278308 A1 | 9/2014 | Liu | |
| 2014/0278990 A1* | 9/2014 | Swanson | G06Q 30/0257 |
| | | | 705/14.55 |
| 2014/0280549 A1* | 9/2014 | Rajan | H04L 67/306 |
| | | | 709/204 |
| 2015/0193888 A1* | 7/2015 | Sayed | H04W 4/21 |
| | | | 705/319 |
| 2016/0125085 A1* | 5/2016 | Vasudevan | G06F 17/30867 |
| | | | 707/734 |
| 2016/0140447 A1* | 5/2016 | Cohen | G06N 5/02 |
| | | | 706/52 |

\* cited by examiner

SEGMENT-BASED CONTENT POOLS FOR INCLUSION IN CONTENT FEEDS

RELATED APPLICATION

This application claims the benefit of U.S. Provisional Application No. 62/169,231, entitled "Segment-Based Content Pools For Inclusion In Content Feeds," by inventors Timothy P. Jurka, et al., filed 1 Jun. 2015, which is hereby incorporated by reference.

The subject matter of this application is related to the subject matter in a co-pending non-provisional application by the same inventors as the instant application and filed on the same day as the instant application, entitled "Blending Content Pools for Inclusion in Content Feeds," having Ser. No. 14/741,316, and filing date 16 Jun. 2015, which is hereby incorporated by reference.

BACKGROUND

Field

The disclosed embodiments relate to filtering of digital content. More specifically, the disclosed embodiments relate to techniques for generating segment-based content pools for inclusion in content feeds.

Related Art

Content feeds such as RSS (Really Simple Syndication) feeds and Atom feeds are mechanisms for presenting content to interested people (e.g., users or subscribers) without requiring them to manually access or retrieve the content from one or more content sources. For example, a social network may generate a news feed of photos, audio, video, documents, articles, and/or other content items that are shared by members of the social network for each user accessing the social network. The user may then click on a posting of the content item within the news feed to navigate to a website on which the content item is hosted and access the entirety of the content item.

Moreover, the user experience with a content feed may be significantly impacted by the selection and ordering of content items in the content feed. For example, a provider of a content feed may risk user fatigue if a subscriber is presented with low-quality content items (e.g., spam), identical content items, content items that repeatedly cover the same subject, and/or content items that are not interesting or relevant to the user.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
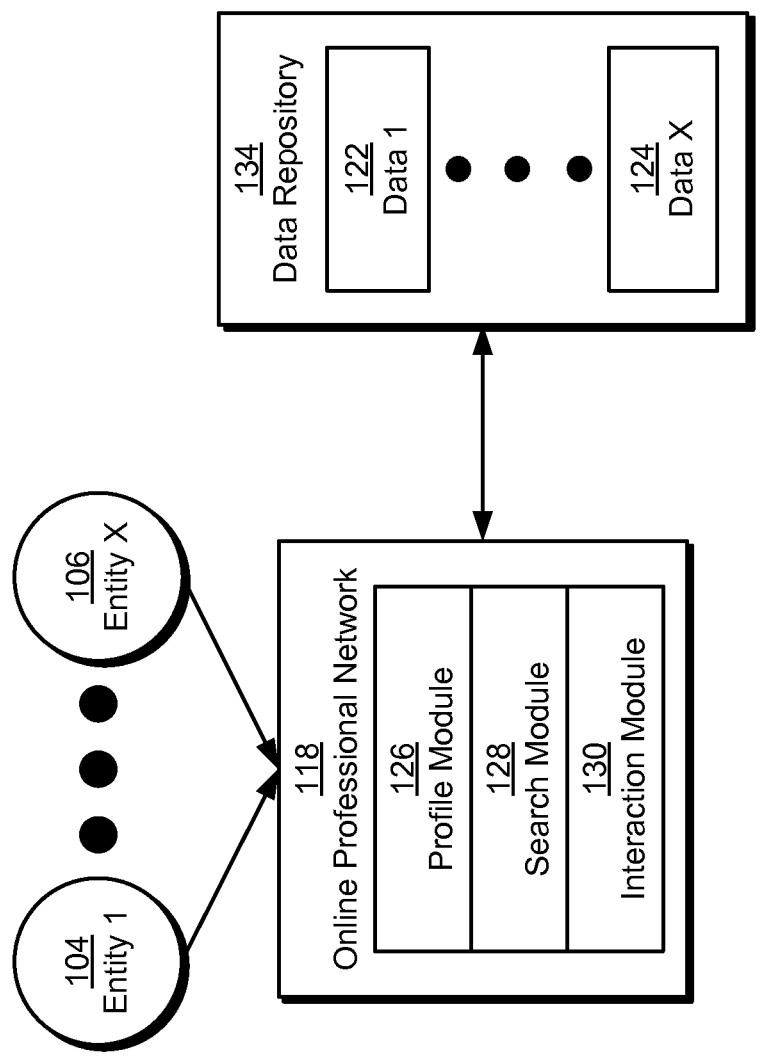
FIG. 1 shows a schematic of a system in accordance with the disclosed embodiments.

The disclosed embodiments provide a method, apparatus, and system for processing data. More specifically, the disclosed embodiments provide a method, apparatus, and system for selecting content for inclusion in a content feed of a social network. As shown in FIG. 1, the social network data may be associated with an online professional network 118 that is used by a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use online professional network 118 to list jobs, search for potential candidates, provide business-related updates to users, advertise, and/or take other action.

The entities may use a profile module 126 in online professional network 118 to create and edit profiles containing information related to the entities' professional and/or industry backgrounds, experiences, summaries, projects, skills, and so on. Profile module 126 may also allow the entities to view the profiles of other entities in online professional network 118.

Next, the entities may use a search module 128 to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature on online professional network 118 to search for profiles, jobs, and/or information by categories such as first name, last name, title, company, school, location, interests, relationship, industry, groups, salary, experience level, etc.

The entities may also use an interaction module 130 to interact with other entities on online professional network 118. For example, interaction module 130 may allow an entity to add other entities as connections, follow other entities, exchange messages with other entities, join groups, and/or interact with (e.g., create, share, re-share, like, and/or comment on) posts from other entities.

Those skilled in the art will appreciate that online professional network 118 may include other components and/or modules. For example, online professional network 118 may include a homepage, landing page, and/or content feed that provides the latest postings, articles, and/or updates from the entities' connections and/or groups to the entities. Similarly, online professional network 118 may include mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, and/or other action performed by an entity in online professional network 118 may be tracked and stored in a database, data warehouse, cloud storage, and/or other data-storage mechanism providing data repository 134.

Figure 2:
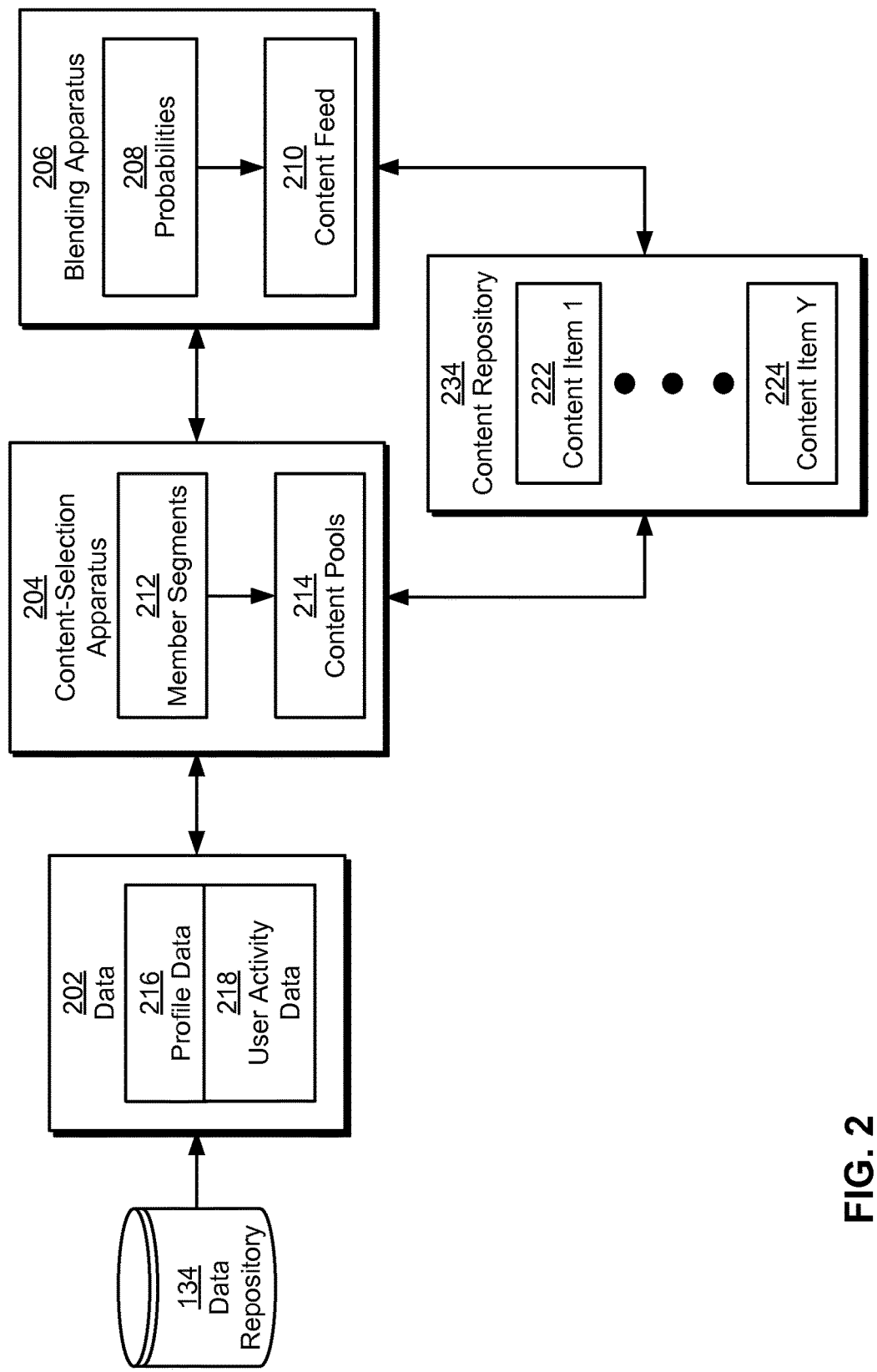
FIG. 2 shows a system for processing data in accordance with the disclosed embodiments.

As shown in FIG. 2, data repository 134 and/or another primary data store may be queried for data 202 that includes profile data 216 for users of a social network (e.g., online professional network 118 of FIG. 1), as well as user activity data 218 that tracks the users' activity within and/or outside the social network. Profile data 216 may include data associated with user profiles in the social network. For example, profile data 216 for an online professional network may include a set of attributes for each user, such as demographic (e.g., gender, age range, nationality, location), professional (e.g., job title, employer, industry, experience, skills, seniority level, professional endorsements), social (e.g., organizations of which the user is a member, geographic area of residence), and/or educational (e.g., degree, university attended, certifications) attributes. Profile data 216 may also include a set of groups to which the user belongs, the user's contacts and/or connections, and/or other data related to the user's background, personal attributes, and/or professional attributes.

User-activity data 218 may include records of user interaction with a set of content items (e.g., content item 1 222, content item y 224) associated with the social network. For example, user-activity data 218 may be used to track impressions, clicks, likes, dislikes, shares, hides, comments, posts, updates, conversions, and/or other user activity associated with the content items. User-activity data 218 may also track other types of activity on the social network, including connections, messages, and/or interaction with groups or events.

The content items may include user profiles, job postings, user posts, status updates, advertisements, articles, images, audio, video, documents, and/or other types of content that can be accessed within or through the social network. Representations of the content items may be stored in a content repository 234 for subsequent retrieval and use. For example, content repository 234 may include an identifier, location (e.g., Uniform Resource Locator (URL)), metadata, and/or content for each content item that is created, posted, featured, and/or shared using the online professional network.

In one or more embodiments, profile data 216 and user activity data 218 are used to generate and customize content feeds (e.g., content feed 210) of content items for users of the social network. For example, a website and/or mobile application associated with the social network may include a "news feed" of the latest activity and updates on the social network. To improve the user experience with the social network, content items in the news feed may be selected and/or ordered based on the behavior and/or interests of users and/or related groups of users in the social network.

More specifically, a content-selection apparatus 204 may generate a set of content pools 214 based on user activity data 218 associated with a set of member segments 212 in the social network. Member segments 212 may include sets of attributes associated with groups of users in the social network. For example, member segments 212 may be defined for different industries, job functions (e.g., groups of similar job titles), demographics, locations, companies, types of companies, skills, levels of seniority, levels of reputation, levels of influence, membership groups, and/or sets of user connections in an online professional network.

In turn, a content pool for a given member segment may include a set of content items that is associated with high levels of user interaction in the member segment. For example, content items in content repository 234 may be included in a content pool for a member segment if the content items have relatively high numbers of recent shares, likes, comments, clicks, and/or impressions in the member segment. Generation of content pools for member segments of social networks is described in further detail below with respect to FIG. 3.

Next, a blending apparatus 206 may calculate a set of probabilities 208 of users clicking on or otherwise interacting with the content items in each content pool. Blending apparatus 206 may then use probabilities 208 to order the content items into content feed 210 for each user of the social network. Probabilities 208 may be calculated based on rankings of content items in content pools 226 and/or features associated with users, member segments 212, and/or content items in the social network. The content items may then be ordered into content feed 210 in descending order of probabilities 208 and/or based on the number of impressions of a given content item or content pool. Blending of content pools into content feeds for users of social networks is described in further detail below with respect to FIG. 4.

Figure 3:
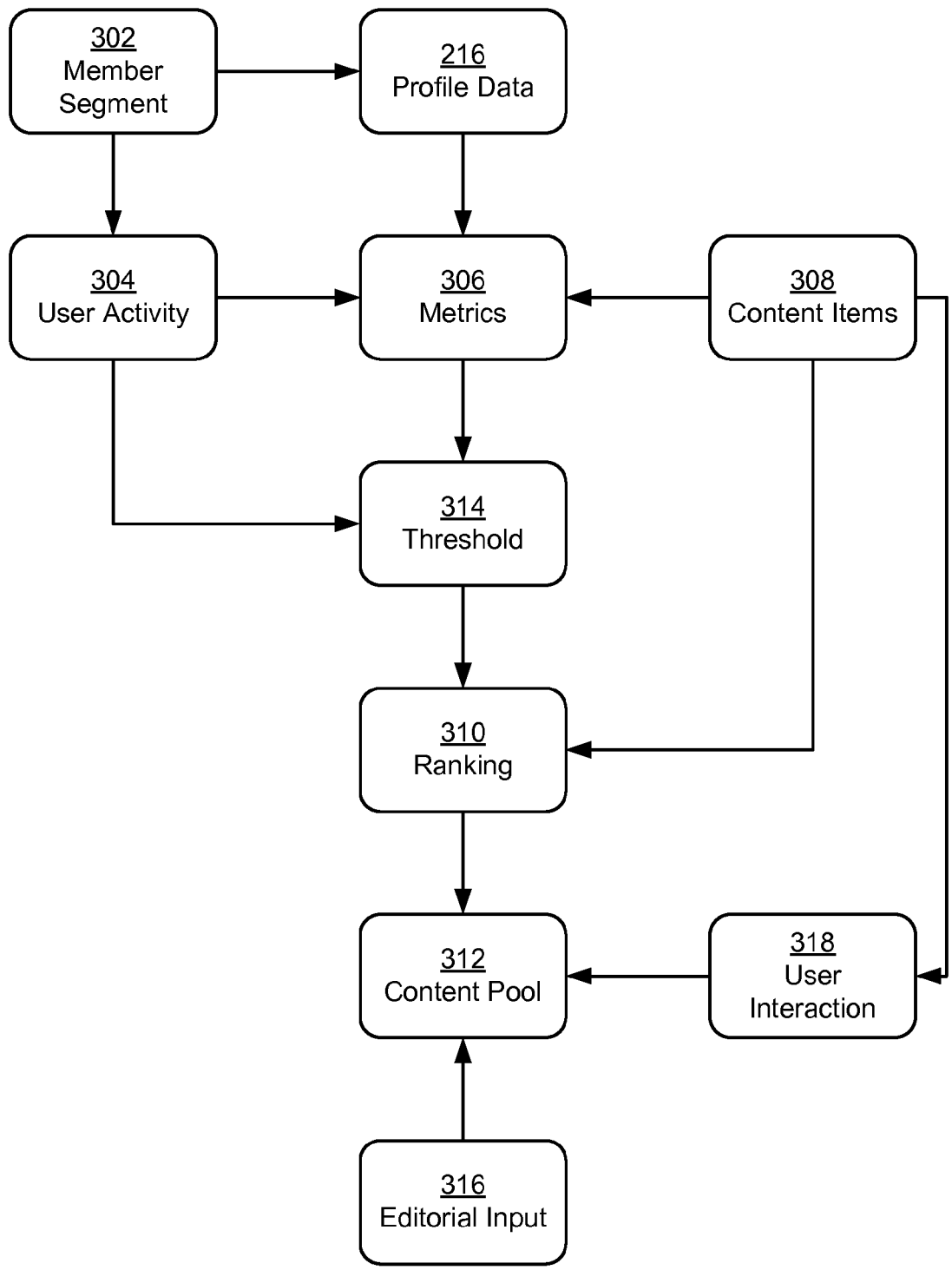
FIG. 3 shows the generation of a content pool for a member segment of a social network in accordance with the disclosed embodiments.

FIG. 3 shows the generation of a content pool 312 for a member segment 302 of a social network in accordance with the disclosed embodiments. As mentioned above, content pool 312 may include a set of content items 308 that are associated with high levels of user activity in member segment 302. For example, content pool 312 may contain "trending" content items 308 in a given industry, company, type of company, job function, group, set of connections, skill, publisher, set of decision makers, set of influencers, and/or other member segment 302 of an online professional network.

To generate content pool 312, user activity 304 associated with member segment 302 is tracked and used to calculate one or more metrics 306 associated with user interaction with content items 308. User activity 304 may include user actions associated with content items 308 and/or other portions of the social network. For example, user activity 304 may include impressions, clicks, likes, dislikes, shares, hides, comments, posts, updates, conversions, connections, messages, and/or other types of user interaction in the social network.

Metrics 306 may thus represent levels of user interaction with content items 308. For example, metrics 306 may track the number of recent (e.g., in the last number of hours or days) likes, shares, comments, clicks, on-site impressions, and/or off-site impressions (e.g., through an embedded "share" button for the social network on a third-party website) of a given content item in a given member segment 302.

To calculate metrics 306 for the content item, records of user interaction with the content item may be collected over a pre-specified period (e.g., number of hours or days) as user activity 304. User activity 304 and profile data 216 for a set of users in the social network may then be used to generate metrics 306 for member segment 302. For example, each record may specify the type of user interaction (e.g., like, share, comment, click, on-site impression, off-site impression), a time of the user interaction, and a user identifier for a user who performed the user interaction. Profile data 216 may be used to identify and group users in different industries, companies, company types, job functions, levels of seniority, levels of reputation, locations, demographics, and/or other member segments. In turn, profile data 216 and records of user activity 304 in each member segment 302 may be aggregated into metrics 306 for the member segment.

Metrics 306 may additionally be calculated from combinations of other metrics. First, metrics 306 may include a click-through rate (CTR) for each content item. The CTR may be calculated as the number of clicks of the content item in member segment 302 divided by the number of impressions of the content item presented to users in member segment 302.

Alternatively, the CTR may be calculated as an exponent (e.g., square, cube, fourth power, etc.) of the number of clicks divided by the number of impressions to increase the value of the CTR for a content item with a large number of impressions when compared to the value of the CTR for a content item with a smaller number of impressions. For example, an article with a 5% CTR and one million impressions may be associated with significantly higher user activity 304 than an article with the same 5% CTR but only 100 impressions. Therefore, to more accurately reflect the high level of user activity 304 for the first article, an "exponentiated CTR" may be calculated for each article by squaring the number of clicks before dividing by the number of impressions. Consequently, the exponentiated CTR for the first article may be $50,000^2/1,000,000$, or 2500, which is 10,000 times higher than the exponentiated CTR for the second article (e.g., $5^2/100$, or 0.25).

Second, metrics 306 may include a pointwise mutual information (PMI) that tracks the topicality of user activity 304 in member segment 302 compared with user activity 304 across the social network. For example, the PMI of a content item may be represented as the probability of a click on the content item within member segment 302 divided by the probability of a click on the content item within the entire social network. In turn, the PMI may be estimated as the CTR of the content item in member segment 302 divided by the CTR of the content item across the social network.

Third, multiple metrics 306 may be combined into an overall "content pool score" for each content item. For example, the content pool score for the content item may be calculated using the following expression:

$$\log(P(\text{click}|\text{segment})/P(\text{click})^\alpha) \approx \log(\text{CTR}(\text{segment})/\text{CTR}(\text{global})^\alpha)$$

Within the expression, the $\alpha$ parameter may be used to balance the global popularity of the content item with the topicality of the content item. As $\alpha$ approaches 1, the expression inside the logarithm approaches the calculation of PMI described above. As $\alpha$ approaches 0, the expression inside the logarithm approaches the CTR for the content item.

In another example, the content pool score for the content item may be calculated as a weighted combination of multiple metrics 306. For example, weights may be assigned to the number of shares, CTR, exponentiated CTR, PMI, and/or other metrics 306 representing user activity 304 with the content item. Each weight may represent the relative importance of the corresponding metric. A higher weight may increase the contribution of the metric to the content pool score, while a lower weight may decrease the contribution of the attribute to the content pool score. The metrics may be multiplied by the corresponding weights and then summed or otherwise aggregated to obtain the content pool score.

After metrics 306 are calculated, a ranking 310 of content items 308 by metrics 306 is obtained. Illustratively, ranking 310 may order content items 308 by descending user activity 304 in member segment 302. As a result, content items 308 at the top of ranking 310 may be associated with the most user activity 304 in member segment 302, and content items 308 at the bottom of ranking 310 may be associated with little to no user activity 304 in member segment 302.

As with calculation of metrics 306, ranking 310 may be generated in a number of ways. For example, ranking 310 may be generated from the values of one or more metrics 306, a combination of multiple metrics 306, and/or an overall content pool score for each content item. Different types of metrics may also be used to generate ranking 310 for different member segments. For example, a PMI metric may be used to rank content items 308 by user activity 304 in various industries, while a number of shares may be used to rank content items 308 by user activity 304 in a user's set of connections.

Once ranking 310 is generated, content pool 312 may be created for member segment 302 based on ranking 310. For example, content pool 312 may be generated as the highest-ranked subset of content items 308 from ranking 310. The subset may be represented by a pre-specified number of content items 308 (e.g., the top 100 content items in ranking 310) and/or content items 308 with metrics 306 and/or content pool scores that exceed a minimum value.

Prior to generating ranking 310 and/or content pool 312, a threshold 314 associated with user activity 304 in member segment 302 may be obtained and compared with one or more metrics 306. If metrics 306 fall below threshold 314, generation of ranking 310 and/or content pool 312 may be omitted for member segment 302. If metrics 306 meet or surpass threshold 314, ranking 310 and content pool 312 may be generated for member segment 302. Threshold 314 may thus prevent the generation of content pool 312 for member segment 302 when member segment 302 is too small and/or does not include enough user activity 304 to identify meaningful trends and/or content. For example, threshold 314 may ensure that user activity 304 in member segment 302 meets a minimum number of impressions, clicks, unique viewers, and/or unique content items. Threshold 314 may also vary by member segment 302. For example, a different type or value of threshold 314 may be used for different types of member segments (e.g., company, company type, job function, industry, skill, etc.) and/or different member segments within the same type (e.g., different industries or companies).

Content pool 312 may also be updated based on editorial input 316 and/or subsequent user interaction 318 with content items 308. Editorial input 316 may be provided by administrative users associated with creating or curating content items 308 in content pool 312 and/or a content feed. For example, an editor may provide editorial input 316 to add a content item to content pool 312, remove a content item from content pool 312, increase or decrease the position of a content item in ranking 310, and/or move a content item to the top of ranking 310 for prioritized display in a content feed. The editor may also trigger a push notification of a content item and/or create a daily digest, set of "editor's picks," and/or other custom content pool of content items for member segment 302 and/or the social network as a whole. A "global" custom content pool may additionally be included in the content feed in the absence of content pool 312 for a given member segment 302 and/or user.

User interaction 318 may include real-time user activity 304 in member segment 302, as well as specific characteristics or preferences of users in member segment 302. For example, user interaction 318 may include real-time clicks, likes, dislikes, comments, shares, and/or impressions of users in member segment 302, which are used to update content pool 312 after content pool 312 is generated by an offline batch-processing system. User interaction 318 may also include user-specified preferences for receiving all, none, more, or less of content associated with a given member segment 302, content pool 312, topic, and/or category. User interaction 318 that indicates a positive response to a particular content item and/or topic may increase the prominence of the content item and/or topic in ranking 310. Conversely, user interaction 318 that indicates a negative response to a content item and/or topic may decrease the prominence of the content item and/or topic in ranking 310.

Figure 4:
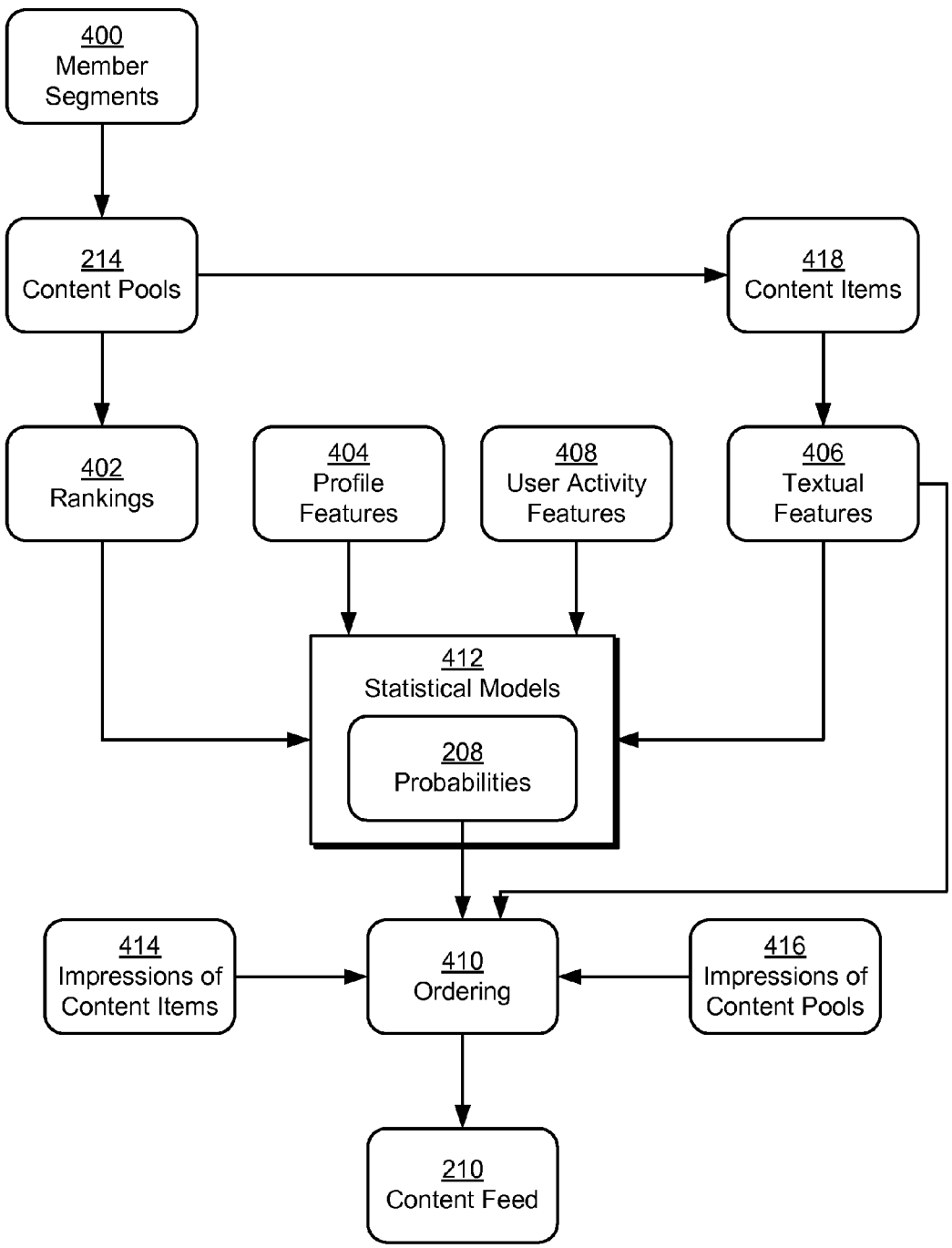
FIG. 4 shows the blending of a set of content pools into a content feed for a user in accordance with the disclosed embodiments.

FIG. 4 shows the blending of a set of content pools 214 into content feed 210 for a user in accordance with the disclosed embodiments. As described above, each content pool may be generated based on user activity in the corresponding member segment. In turn, the user may be associated with a number of member segments 400 in a social network. For example, profile data for the user may identify certain demographic, job function, industry, company, company type, and/or seniority attributes that are associated with certain member segments 400 in an online professional network. Member segments 400 of the user may also include connections, influencers, decision makers, channels, groups, and/or other entities associated with the user.

Consequently, the relevance of content feed 210 to the user may be increased by populating content feed 210 with content items 418 from content pools 214 associated with member segments 400 to which the user belongs. Once member segments 400 are identified, content pools 214 associated with member segments 400 may be obtained. As discussed above, each content pool may include a set of content items 418 associated with relatively high levels of user activity in the corresponding member segment, "trending" content items in the member segment, and/or other types of content that may be relevant to the member segment.

Content pools 214 may further include rankings 402 of content items 418. Each ranking may include an ordered list of content items in the corresponding content pool, as well as the values of one or more metrics and/or content pool scores used to obtain the ordered list. A content item with a higher metric and/or score may thus be ranked higher in the list than a content item with a lower metric and/or score.

Rankings 402 may be provided as input to one or more statistical models 412, along with a set of profile features 404, a set of textual features 406, and/or a set of user activity features 408. Profile features 404 may include profile data (e.g., profile data 216 of FIG. 2) for the user, and user activity features 408 may include user activity data (e.g., user activity data 218 of FIG. 2). Profile features 404 may thus include the user's age, gender, location, income level, industry, job function, reputation score, decision maker score, and/or seniority, while user activity features 408 may include explicit and/or inferred user preferences for or against certain types of content and/or content pools 418. For example, the user's lack of interest in news from a certain company or type of company may be explicitly declared by the user (e.g., in a user setting) and/or inferred from the user's actions (e.g., hiding or ignoring news stories about the company or type of company).

Textual features 406 may include features that are extracted from text and/or other textual representations of information (e.g., audio, video, images, etc.) in content items 418. For example, textual features 406 may include users, entities (e.g., companies, schools, etc.), and/or topics mentioned in each content item; the sentiment of the content item; the quality of the content item; the language of the content item; and/or the reading level of the content item.

Statistical models 412 may use rankings 402, profile features 404, textual features 406, and user activity features 408 to calculate a set of probabilities 208 of the user clicking on content items 418. For example, a separate logistic regression model may be used to calculate a set of probabilities 208 for each content pool associated with a member segment of the user. Conversely, the same statistical model may be used to calculate the user's probabilities 208 of clicking content items 418 in multiple content pools 214 associated with multiple member segments 400.

Those skilled in the art will appreciate that different types and/or combinations of statistical models 412 may be used to calculate probabilities 208. For example, statistical models 412 may include artificial neural networks, decision trees, Bayesian networks, support vector machines, clustering techniques, and/or other implementations of machine-learning techniques. Probabilities 208 for a content pool may be obtained as the output of one statistical model or as weighted combinations of outputs from multiple statistical model. The output of one statistical model may also be provided as input to another statistical model until a final representation of probabilities 208 is obtained.

The granularity of statistical models 412 may also be adjusted based on the types and amount of data available in the corresponding features (e.g., rankings 402, profile features 404, textual features 406, user activity features 408). For example, each statistical model may calculate a set of probabilities 208 of clicking on content items 418 in one or more content pools 412 based on features that include the industry of the user, the content pool scores of content items 418 from rankings 402, and an identifier for each content pool. As a result, the statistical model may personalize blending of content pools 412 into content feed 210 by industry. On the other hand, the statistical model may use additional profile features 404, textual features 406, and/or user activity features 408 to customize the creation of content feed 210 for individual users and/or smaller member segments 400, if enough data is available. If not enough data is available for finer-grained customization (e.g., if the user has not previously interacted with content items 418 and/or content pools 214), customization may be performed at a different level (e.g., company, industry, job function, etc.) until enough data has been collected from the user to estimate probabilities 208 for the user.

Probabilities 208 outputted by statistical models 412 may then be used to generate an ordering 410 of content items 418 into content feed 210. For example, content items 418 may be ordered within content feed by descending probability of clicking by the user. As a result, the content item at the top of content feed 210 may have the highest probability of clicking by the user (e.g., as calculated by statistical models 412), and a given content item in content feed 210 may have the same or higher probability of clicking by the user than subsequent content items in content feed 210.

Probabilities 208 and/or ordering 410 may also be updated based on a number of impressions of content items 414 and/or a number of impressions of content pools 416 associated with the user. Impressions of content items 414 may track the number of times the user has viewed content items 418 within content feed 210, in another part of the social network, and/or on an external website or application. Impressions of content pools 416 may track the number of times the user has viewed content items 418 grouped by content pools 214 within content feed 210, in another part of the social network, and/or on an external website or application.

As the number of impressions of a given content item presented to the user increases, the probability of the user clicking on the content item may be decreased, either by statistical models 412 or after probabilities 208 have been calculated by statistical models 412. For example, the probability of clicking the content item may be multiplied by a "discount factor" that is initially set to 1. Each time the content item is viewed by the user, the value of the factor is lowered. When the factor reaches 0, the probability of clicking the content item is also set to 0, and the content item is removed from content feed 210.

Similarly, as the number of impressions of content items in a given content pool increases, the prominence of that content pool in content feed 210 may be decreased. For example, the prominence of the content pool may be represented by a "diversification factor" that is a value between 0 and 1. The factor may be exponentiated by the number of times the content pool has been viewed. As a result, a content pool that has been viewed less by the user may be featured more prominently in content feed 210 than a content pool that has been viewed more by the user.

Textual features 406 may additionally be used to merge similar content items 418 into a single content item before including the content item in content feed 210. For example, measures of similarity such as term frequency-inverse document frequency (tf-idf) and/or cosine similarity may be calculated from textual representations of content items 418. Similarly, a topic-mining technique may be used to identify a set of topics in each content item. Content items with high similarity and/or overlapping topics may then be merged into a smaller set of content items to reduce the duplication of substantially identical and/or highly similar content items or topics in content feed 210. In turn, the probability of clicking a single, merged content item may be calculated from one or more probabilities of the content items affected by the merge. For example, the probability of clicking the merged content item may be obtained as the average and/or highest probability from the set of content items that have been merged into the content item.

Once content feed 210 is generated from ordering 410, content feed 210 may be presented to the user. For example, content feed 210 may be displayed to the user as a vertical sequence of posts or stories. Each post or story may include a name, description, and/or other metadata associated with the corresponding content item. Metadata for the content item may also be accompanied by a "reason" for showing the content item, such as "trending in your industry," "trending in your company," "trending in similar companies," "popular among people with your skills," "decision makers at your company," "trending among publishers you follow," "posts by your network," "people in the news," "editor's picks," "breaking news," "company in the news," "channels you follow," and/or "shares or likes by your network." Consequently, the "reason" may identify the member segment and/or content pool associated with the content item.

Figure 5:
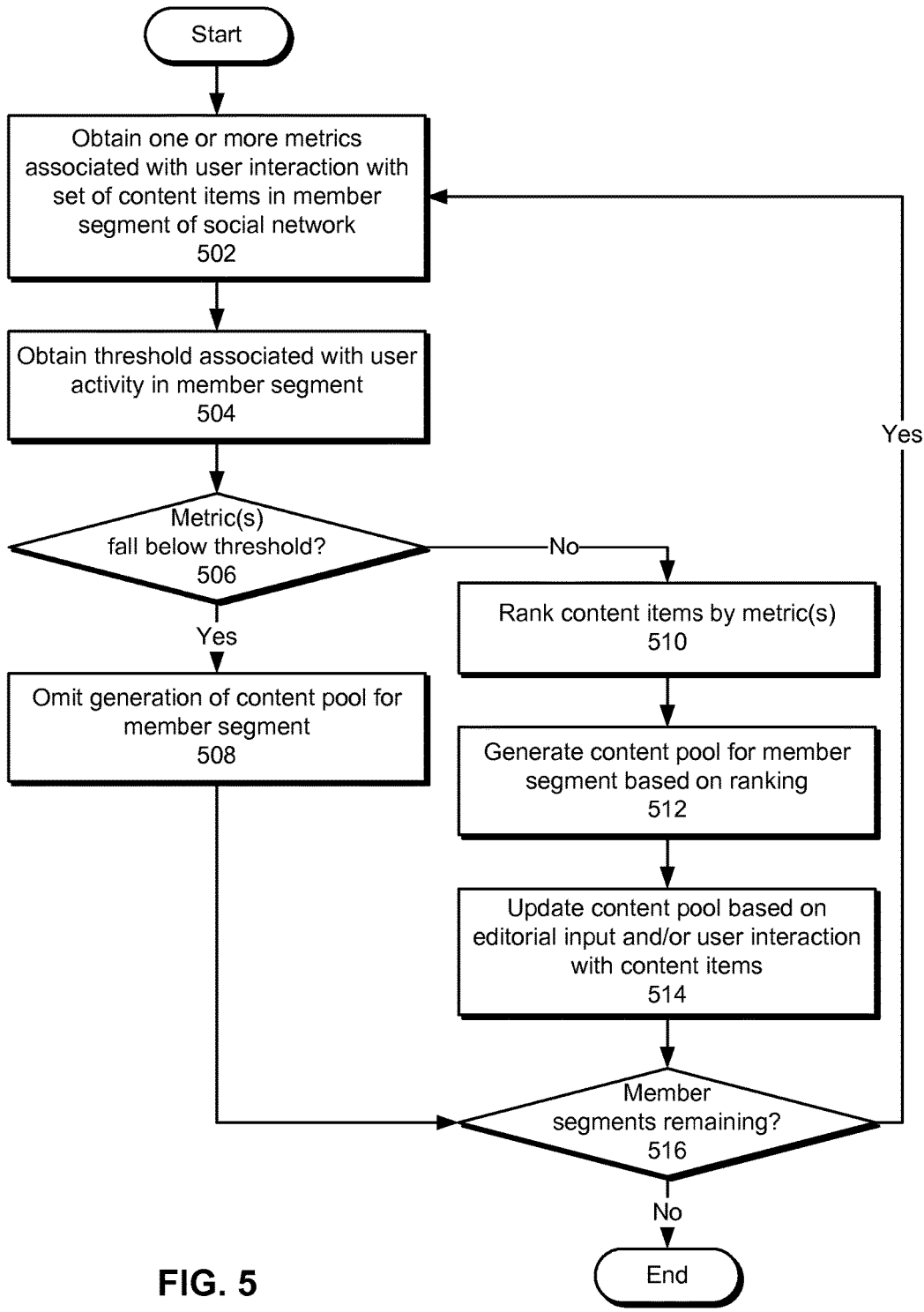
FIG. 5 shows a flowchart illustrating the processing of data in accordance with the disclosed embodiments.

FIG. 5 shows a flowchart illustrating the processing of data in accordance with the disclosed embodiments. More specifically, FIG. 5 shows a flowchart of the generation of a set of content pools for a set of member segments in a social network. In one or more embodiments, one or more of the steps may be omitted, repeated, and/or performed in a different order. Accordingly, the specific arrangement of steps shown in FIG. 5 should not be construed as limiting the scope of the embodiments.

Initially, one or more metrics associated with user interaction with a set of content items in a member segment of a social network are obtained (operation 502). The member segment may be associated with an industry, a company, a company type (e.g., small, large, industry, field, public, private, etc.), a skill, a decision maker (e.g., a senior executive at a company), a reputation score, a publisher (e.g., a news or content source), one or more connections, and/or a job function (e.g., an aggregation of similar job titles).

The metric(s) may include a number of shares, a number of clicks, a number of impressions, a CTR, an exponentiated CTR (e.g., a number of clicks raised to an exponent divided by a number of impressions), a PMI, a member score, and/or a title similarity. The metric(s) may be obtained based on profile data and/or user activity data from the social network. For example, user interaction (e.g., clicks, likes, dislikes, hides, shares, reads, comments, etc.) with the set of content items may be tracked by the social network and matched to profile data for a set of users in the social network to generate the metric(s).

Next, a threshold associated with user activity in the member segment is obtained (operation 504) and compared to the metric(s) to determine if the metric(s) fall below the threshold (operation 506). The threshold may ensure that user activity in the member segment meets a minimum number of impressions, clicks, unique viewers, unique content items, and/or level of interaction before a content pool is generated for the member segment. If the metric(s) fall below the threshold, generation of the content pool for the member segment is omitted (operation 508).

If the metric(s) do not fall below the threshold, the content pool is generated for the member segment. To generate the content pool, the content items are ranked by the metric(s) (operation 510), and the content pool is generated for the member segment based on the ranking (operation 512). For example, the content items may be ranked in descending order of user activity, and the highest-ranked subset of content items in the ranking may be included in the content pool. As a result, the content pool may include content items that are associated with the highest levels of user interaction in the member segment, or content items that are "trending" in the member segment.

The content pool is also updated based on editorial input and/or additional user interaction with the content items (operation 514). For example, the editorial input may be used to add a content item to the content pool, remove a content item from the content pool, and/or reposition a content item in the ranking. The user interaction may be used to identify, in real-time, the user preferences of users in the member segment and update the content pool according to the user preferences.

Content pools may continue to be generated for remaining member segments (operation 516) in the social network. If a content pool is to be generated for a member segment, metric(s) associated with user interaction with the content items in the member segment are obtained (operation 502), and the content pool is generated or omitted based on a threshold associated with user activity in the member segment (operations 504-514). Metric-based generation of content pools for member segments in the social network may thus continue until content pools have been generated or omitted for all relevant member segments in the social network.

Figure 6:
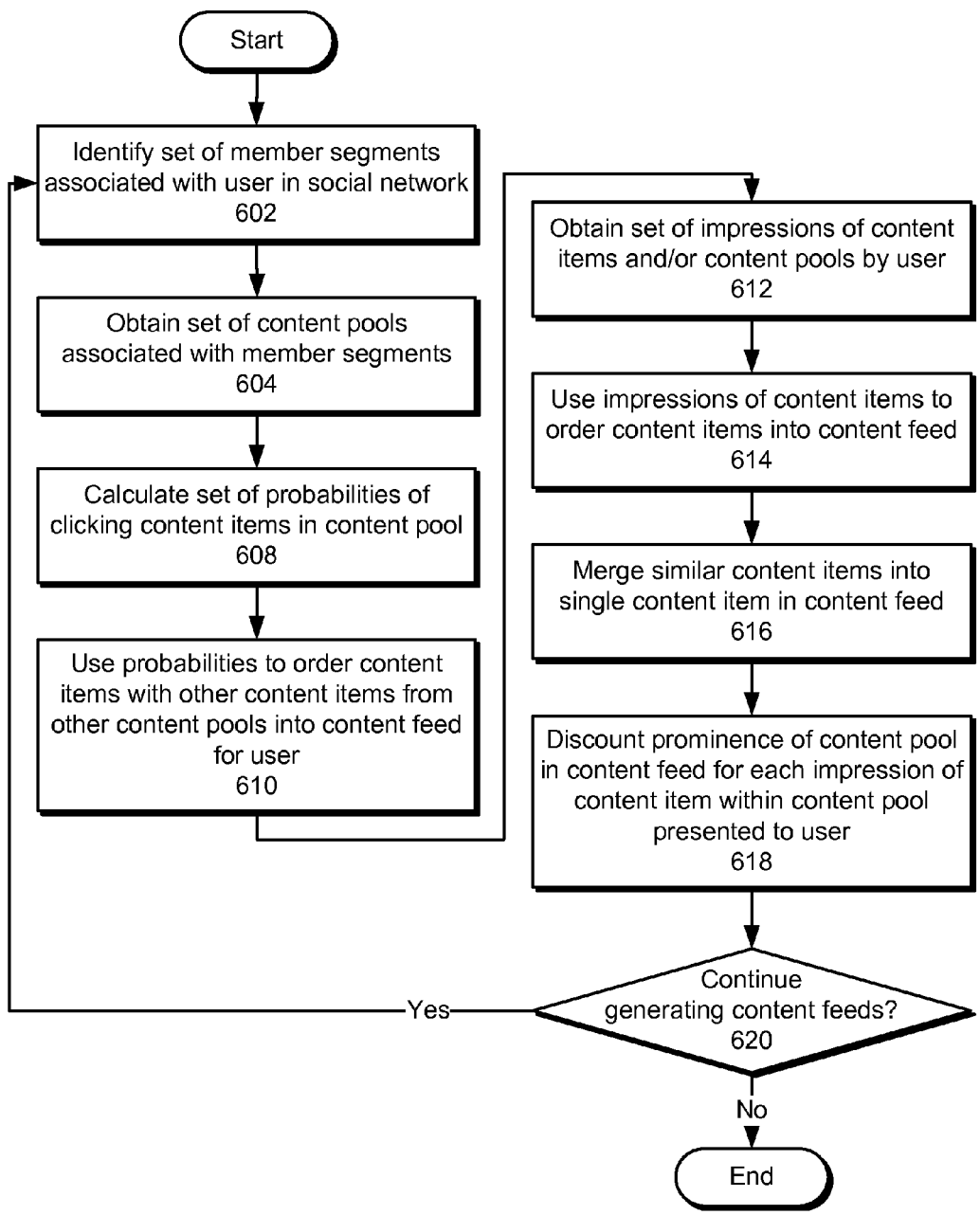
FIG. 6 shows a flowchart illustrating the processing of data in accordance with the disclosed embodiments.

FIG. 6 shows a flowchart illustrating the processing of data in accordance with the disclosed embodiments. In particular, FIG. 6 shows a flowchart of the generation of a content feed from a set of content pools. In one or more embodiments, one or more of the steps may be omitted, repeated, and/or performed in a different order. Accordingly, the specific arrangement of steps shown in FIG. 6 should not be construed as limiting the scope of the embodiments.

First, a set of member segments associated with a user in a social network is identified (operation 602). The member segments may be identified by matching attributes of the user (e.g., demographics, company, industry, skills, groups, follows, connections, level of seniority, reputation, etc.) to attributes of the member segments. Next, a set of content pools associated with the member segments is obtained (operation 604). Each content pool may include a set of content items associated with user activity in the corresponding member segment. For example, the content pool may be generated using one or more metrics associated with user interaction with a set of content items in the member segment, as described above.

A set of probabilities of clicking the content items in the content pool is then calculated (operation 608). For example, a set of features associated with user activity in the social network may be obtained, and a statistical model may be applied to the set of features to estimate the probabilities. The features may include profile data for the user, a frequency of interaction with (e.g., clicks, shares, likes, dislikes, comments, etc.) the content pool, and/or a ranking of the content items in the content pool. The features may also include textual features associated with the content items, such as sentiments of the content items, topics in the content items, reading levels of the content items, languages of the content items, and/or qualities of the content items.

The probabilities are used to order the content items with other content items from other content pools into the content feed for the user (operation 610). For example, the content items may be ordered in the content feed by descending probability of clicking by the user.

A set of impressions of the content items and/or content pools by the user is also obtained (operation 612), and the impressions of the content items are used to order the content items into the content feed (operation 614). For example, a probability of clicking a content item may be discounted for each impression of the content item presented to the user.

Similar content items are additionally merged into a single content item in the content feed (operation 616). For example, content items with significantly overlapping topics, words, and/or sentences may be merged into one content item to reduce the duplication of content in the content feed.

The prominence of each content pool in the content feed is further discounted for each impression of a content item within the content pool presented to the user (operation 618). For example, the number and/or position of content items in the content pool may be reduced as the number of impressions of the content pool by the user increases to allow the user to view content items from different content pools within the content feed.

Generation of content feeds may continue (operation 620) for other users and/or user sessions in the social network. If a content feed is to be generated for a user, a set of member segments associated with the user in the social network is identified (operation 602), and content pools associated with the member segments are obtained (operation 604). Content items in the content pools are then ordered into the content feed based on a set of probabilities of clicking the content items by the user, impressions of the content items and/or content pools, and/or the presence of similar content items in the content pools (operations 608-618). Generation of content feeds for users of the social network may thus continue until content pools are no longer used to generate the content feeds.

Figure 7:
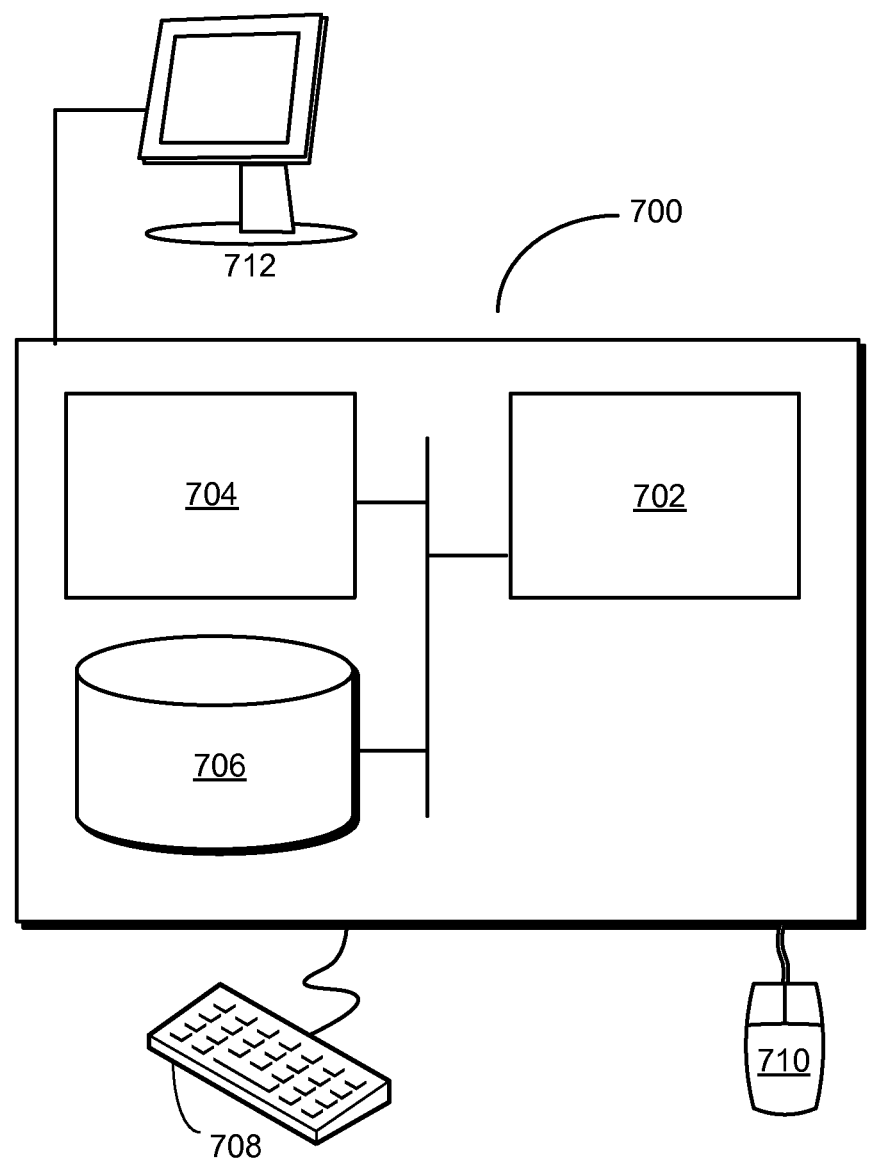
FIG. 7 shows a computer system in accordance with the disclosed embodiments.

FIG. 7 shows a computer system 700 in accordance with an embodiment. Computer system 700 may correspond to an apparatus that includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for processing data. The system may include a content-selection apparatus that obtains one or more metrics associated with user interaction with a set of content items in a member segment of a social network. Next, the content-selection apparatus ranks the set of content items by the one or more metrics. The content-selection apparatus then generates a content pool for the member segment based on the ranking of the content items.

The system may also include a blending apparatus that obtains a set of content pools for a user. Next, the blending apparatus calculates a set of probabilities of clicking the content items in the content pool and uses the probabilities to order the content items with other content items from other content pools into a content feed for the user. The blending apparatus then presents the content feed to the user.

In addition, one or more components of computer system 700 may be remotely located and connected to the other components over a network. Portions of the present embodiments (e.g., content-selection apparatus, blending apparatus, data repository, content repository, etc.) may also be located on different nodes of a distributed system that implements the embodiments. For example, the present embodiments may be implemented using a cloud computing system that generates a set of content pools and/or content feeds for a set of remote users and presents the content pools and/or content feeds to the users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for processing data, comprising:
obtaining one or more metrics associated with user interaction with a set of content items in a member segment of a social network, wherein the member segment is based on attributes specified by one or more users in corresponding user profiles of the social network;
generating a threshold associated with user activity in the member segment, based at least in part on a number of members in the member segment;
when the one or more metrics are less than the threshold, omitting generation of a content pool for the member segment; and
when the one or more metrics are greater than the threshold:
ranking, by one or more computer systems, the set of content items by the one or more metrics;
generating, by the one or more computer systems, the content pool for the member segment based on the ranking of the content items; and
creating a content feed from the content pool for presentation to a user in the member segment.

2. The method of claim 1, wherein the threshold is further based at least in part on:
a number of clicks;
a number of shares;
a number of impressions; and
a number of users in the member segment interacting with the set of content items.

3. The method of claim 1, further comprising:
updating the content pool based on editorial input from one or more users.

4. The method of claim 1, wherein obtaining the one or more metrics comprises:
tracking the user interaction with the set of content items in the social network; and
using the tracked user interaction and profile data for the set of users in the social network to generate the one or more metrics for the member segment.

5. The method of claim 1, wherein generating the content pool for the member segment based on the ranking of the content items comprises:
selecting a highest-ranked subset of the content items for inclusion in the content pool.

6. The method of claim 1, wherein creating the content feed from the content pool comprises:
calculating a set of probabilities of clicking a subset of the content items in the content pool; and
using the probabilities to combine the ranked content items with other content items from other content pools in the content feed.

7. The method of claim 1, further comprising:
updating the ranking based on the user interaction with the set of content items.

8. The method of claim 1, wherein the one or more metrics comprise at least one of:
a number of shares;
a click-through rate (CTR);
an exponentiated CTR;
a number of clicks;
a number of impressions;
a pointwise mutual information (PMI);
a member score; and
a title similarity.

9. The method of claim 1, wherein the member segment is associated with at least one of:
an industry;
a company;
a company type;
a skill;
a decision maker;
a publisher;
one or more connections; and
a job function.

10. The method of claim 1, wherein the user interaction comprises at least one of a click, a like, a dislike, a hide, a share, a read, and a comment.

11. An apparatus, comprising:
one or more processors; and
memory storing instructions that, when executed by the one or more processors, cause the apparatus to:
obtain one or more metrics associated with user interaction with a set of content items in a member segment of a social network, wherein the member segment is based on attributes specified by one or more users in corresponding user profiles of the social network;
generate a threshold associated with user activity in the member segment, based at least in part on a number of members in the member segment;
when the one or more metrics are less than the threshold, omit generation of a content pool for the member segment; and
when the one or more metrics are greater than the threshold:
rank the set of content items by the one or more metrics;
generate the content pool for the member segment based on the ranking of the content items; and
create a content feed from the content pool for presentation to a user in the member segment.

12. The apparatus of claim 11, wherein the memory further stores instructions that, when executed by the one or more processors, cause the apparatus to:
update the content pool based on editorial input from one or more users.

13. The apparatus of claim 11, wherein the memory further stores instructions that, when executed by the one or more processors, cause the apparatus to:
update the ranking based on the user interaction with the set of content items.

14. The apparatus of claim 11, wherein obtaining the one or more metrics comprises:
tracking the user interaction with the set of content items in the social network; and
using the tracked user interaction and profile data for the set of users in the social network to generate the one or more metrics for the member segment.

15. The apparatus of claim 11, wherein generating the content pool for the member segment based on the ranking of the content items comprises:
selecting a highest-ranked subset of the content items for inclusion in the content pool.

16. The apparatus of claim 11, wherein the member segment is associated with at least one of:
an industry;
a company;
a company type;
a skill;
a decision maker;
a publisher;
one or more connections; and
a job function.

17. A system, comprising:
a content-selection non-transitory computer-readable medium comprising instructions that, when executed by one or more processors, cause the system to:
obtain one or more metrics associated with user interaction with a set of content items in a member segment of a social network, wherein the member segment is based on attributes specified by one or more users in corresponding user profiles of the social network;
generate a threshold associated with user activity in the member segment, based at least in part on a number of members in the member segment;
when the one or more metrics are less than the threshold, omit generation of a content pool for the member segment; and
when the one or more metrics are greater than the threshold:
rank the set of content items by the one or more metrics; and
generate the content pool for the member segment based on the ranking of the content items; and
a blending non-transitory computer-readable medium comprising instructions that, when executed by one or more processors, cause the system to create a content feed from the content pool for presentation to a user in the member segment, wherein the content feed includes the content pool only when the one or more metrics are greater than the threshold.

* * * * *